United States Patent
Miles et al.

(10) Patent No.: US 11,572,824 B2
(45) Date of Patent: Feb. 7, 2023

(54) ELECTRIFIED ENGINE BOOST COMPONENTS FOR MITIGATING ENGINE STALLING IN A WORK VEHICLE

(71) Applicant: Deere & Company, Moline, IL (US)

(72) Inventors: Scott R. Miles, Cedar Falls, IA (US); Pratir R. Punjani, Waterloo, IA (US); Danan Dou, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 5 days.

(21) Appl. No.: 17/319,256

(22) Filed: May 13, 2021

(65) Prior Publication Data

US 2022/0364501 A1 Nov. 17, 2022

(51) Int. Cl.
*F02B 39/10* (2006.01)
*F02N 11/04* (2006.01)
(Continued)

(52) U.S. Cl.
CPC .......... *F02B 39/10* (2013.01); *F02D 41/0007* (2013.01); *F02N 11/04* (2013.01);
(Continued)

(58) Field of Classification Search
CPC ...... F02B 37/004; F02B 37/013; F02B 39/10; F02D 41/0007; F02D 2200/101; F02N 11/04
See application file for complete search history.

(56) References Cited

U.S. PATENT DOCUMENTS 6,062,026 A 5/2000 Woollenweber et al.
6,138,649 A 10/2000 Khair et al.
(Continued)

FOREIGN PATENT DOCUMENTS

DE 9421145 U1 5/1995
DE 102006015390 A1 10/2007
(Continued)

OTHER PUBLICATIONS

USPTO Final Office Action issued in Utility U.S. Appl. No. 17/237,876 dated Mar. 8, 2022.
(Continued)

*Primary Examiner* — Ngoc T Nguyen
(74) *Attorney, Agent, or Firm* — Klintworth & Rozenblat IP LLP

(57) ABSTRACT

An engine system includes an internal combustion engine, an energy storage device configured to provide electrical power, and an electrified air-boost system powered by the electrical power from the energy storage device to boost intake air to the engine, with the electrified air-boost system further including an electrical machine and a pressure device driven by the electrical machine to output boosted intake air to the engine. The engine system also includes a controller operably connected with the electrified air-boost system, with the controller configured to monitor engine speed and engine load during operation of the engine, identify an impending engine stall condition based on the monitored engine speed and engine load, and when the impending engine stall condition is identified, temporarily operate the electrified air-boost system to boost the intake air to the engine, thereby boosting a torque output of the engine.

20 Claims, 6 Drawing Sheets

(51) Int. Cl.
*F02D 41/00* (2006.01)
*F02B 37/013* (2006.01)
*F02B 37/00* (2006.01)

(52) U.S. Cl.
CPC .......... *F02B 37/004* (2013.01); *F02B 37/013* (2013.01); *F02D 2200/101* (2013.01)

(56) References Cited

U.S. PATENT DOCUMENTS

| | | |
|---|---|---|
| 6,647,724 B1 | 11/2003 | Arnold et al. |
| 8,176,736 B2 | 5/2012 | Janssen |
| 8,181,452 B2 | 5/2012 | Bidner et al. |
| 8,522,756 B2 | 9/2013 | Vuk et al. |
| 8,820,056 B2 | 9/2014 | VanDyne et al. |
| 9,347,365 B2 | 5/2016 | Hunter |
| 9,540,989 B2 | 1/2017 | Sanchez Perez et al. |
| 9,869,258 B2 | 1/2018 | Dion |
| 10,145,320 B1 | 12/2018 | Zeng et al. |
| 10,641,191 B2 | 5/2020 | Zeng et al. |
| 11,205,789 B2 | 12/2021 | Tanimoto |
| 2008/0092861 A1 | 4/2008 | Duffy et al. |
| 2009/0107142 A1 | 4/2009 | Russell et al. |
| 2010/0018203 A1 | 1/2010 | Richards |
| 2010/0146968 A1 | 6/2010 | Simpson et al. |
| 2011/0016862 A1 | 1/2011 | Song et al. |
| 2011/0209473 A1 | 9/2011 | Fritz et al. |
| 2013/0098030 A1 | 4/2013 | Freund et al. |
| 2013/0297126 A1 * | 11/2013 | Yamazaki ............. B60W 10/08 180/65.265 |
| 2014/0109571 A1 | 4/2014 | Primus et al. |
| 2016/0010576 A1 | 1/2016 | Primus et al. |
| 2016/0265468 A1 | 9/2016 | Takayanagi et al. |
| 2019/0107066 A1 | 4/2019 | Kurtz et al. |
| 2019/0383244 A1 | 12/2019 | Kim |
| 2020/0011229 A1 | 1/2020 | Waldron et al. |
| 2020/0173354 A1 * | 6/2020 | Punjani ................... F01N 13/10 |
| 2020/0309059 A1 | 10/2020 | Hotta et al. |
| 2021/0277849 A1 | 9/2021 | Rahm et al. |
| 2022/0090566 A1 | 3/2022 | Magnusson et al. |
| 2022/0106919 A1 | 4/2022 | Carlén Andersson et al. |

FOREIGN PATENT DOCUMENTS

| | | |
|---|---|---|
| DE | 102009028925 A1 | 3/2011 |
| DE | 102011077148 A1 | 12/2012 |
| DE | 102012202857 A1 | 8/2013 |
| DE | 102015208418 A1 | 10/2016 |
| FR | 3024178 A1 | 1/2016 |
| FR | 3035151 A1 | 10/2016 |
| FR | 3035443 A1 | 10/2016 |
| FR | 3035444 A1 | 10/2016 |
| FR | 3036738 A1 | 12/2016 |
| FR | 3037616 A1 | 12/2016 |
| FR | 3051225 A1 | 11/2017 |
| FR | 3053397 A1 | 1/2018 |
| FR | 3054602 A1 | 2/2018 |
| GB | 304124 | 11/1958 |
| JP | 39268916 A1 | 10/1997 |
| JP | 2001073880 A1 | 3/2001 |
| JP | 2006057570 A | 3/2006 |
| JP | 1788531 B2 | 10/2011 |
| KR | 101999909 B1 | 7/2019 |
| RU | 2719758 C2 | 4/2020 |
| WO | WO-2013068800 A1 * | 5/2013 ............ B60W 10/06 |
| WO | WO-2013186373 A1 * | 12/2013 .............. F02B 33/40 |
| WO | WO-2019219701 A1 * | 11/2019 ............. F01N 3/021 |
| WO | 2020064679 A1 | 4/2020 |
| WO | 2021005613 A1 | 1/2021 |

OTHER PUBLICATIONS

USPTO Non-Final Office Action issued in Utility U.S. Appl. No. 17/306,604 dated Sep. 13, 2022. (13 pages).
USPTO Non-Final Office Action issued in Utility U.S. Appl. No. 17/406,656 dated Sep. 15, 2022. (16 pages).
USPTO Non-Final Office Action issued in Utility U.S. Appl. No. 17/237,876 dated Aug. 31, 2021.
USPTO Non-Final Office Action issued in Utility U.S. Appl. No. 17/237,876 dated Jan. 21, 2022.
USPTO Non-Final Office Action issued in Utility U.S. Appl. No. 17/308,331 dated Jul. 21, 2022. (23 pages).
USPTO Final Office Action issued in Utility U.S. Appl. No. 17/358,587 dated Jul. 25, 2022. (17 pages).
Garrett Advancing Motion, 48V Electric Compressor for Mild Hybrid Vehicles, © 2021 Garrett Motion Inc. (9 pages).
Eaton, Diesel Engine EGR Pump, Precision Air Flow, https://www.eaton.com/us/en-US/products/engine-solutions/superchargers/TVS-technology-applications/tvs-diesel-egr-pump.html, © 2021 Eaton. (5 pages).
Garrett Advancing Motion, E-Turbo Technology Accelerating Global Powertrain Electrification Trends Beginning with Mercedes-AMG, Media Pressroom—Press Releases, Jul. 22, 2020, © 2021 Garrett Motion Inc. (4 pages).
University Wisconsin, Electric Turbo Chargers, Overview of Forced Induction System, WEMPEC Electrification of FIS, EFIS Topologies, © Board of Regents of the University of Wisconsin System, Mar. 2016. (1 page).
Utility U.S. Appl. No. 17/237,876, filed Apr. 22, 2021.
Utility U.S. Appl. No. 17/306,604, filed May 3, 2021.
Utility U.S. Appl. No. 17/308,331, filed May 5, 2021.
USPTO Non-Final Office Action issued in Utility U.S. Appl. No. 17/237,876 dated Aug. 16, 2022. (18 pages).

* cited by examiner

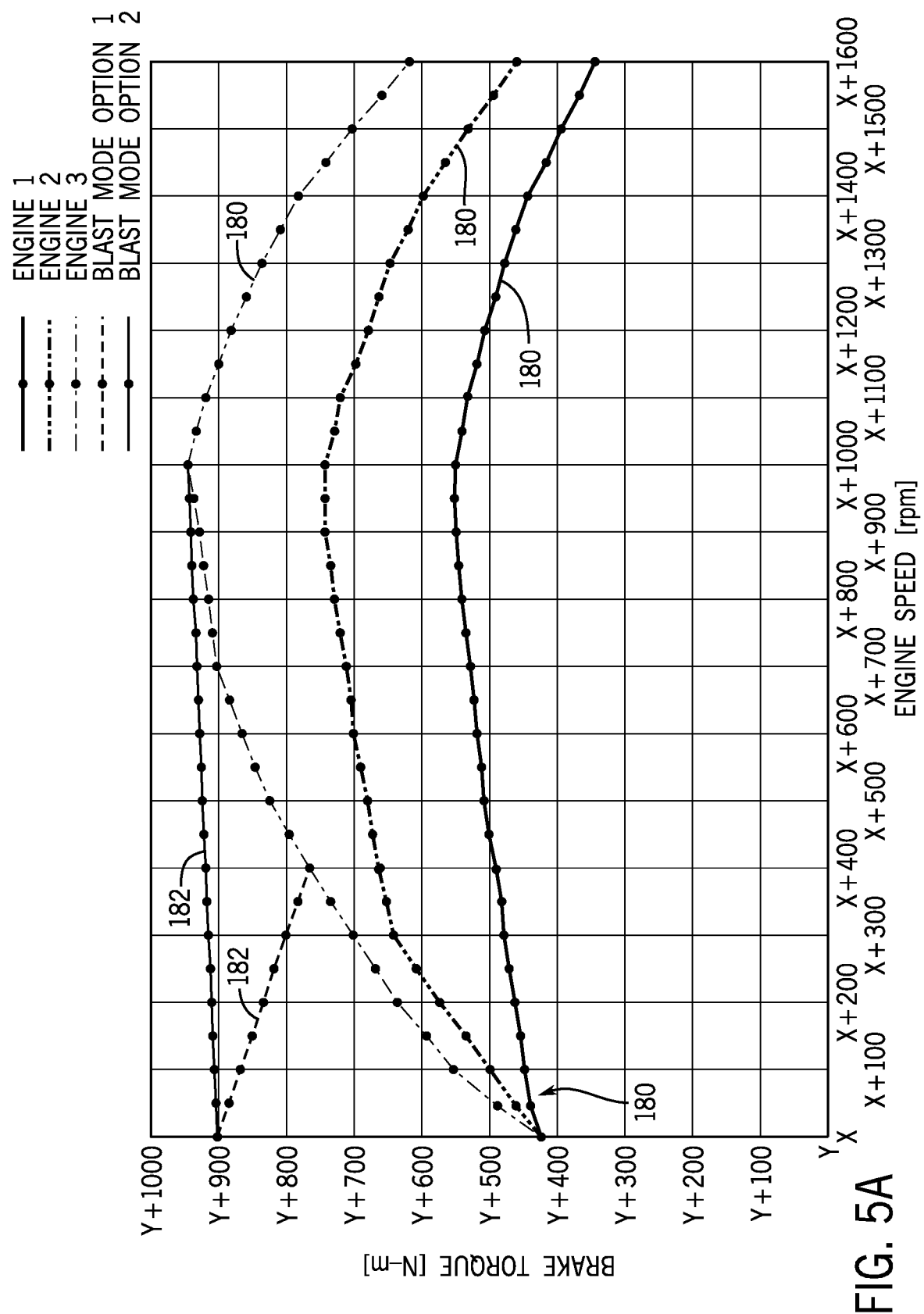

ELECTRIFIED ENGINE BOOST COMPONENTS FOR MITIGATING ENGINE STALLING IN A WORK VEHICLE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to internal combustion engines and, more particularly, to such engines systems having electrified engine components that operate to boost engine torque.

BACKGROUND OF THE DISCLOSURE

Internal combustion engines are used to power non-road or work vehicles under a wide variety of load conditions and must be able to accept sudden changes in load. Thus, when a sudden increase in load is demanded, the engines are expected to respond by quickly increasing output torque. When this sharp increase in load demand occurs with the engine operating at low speeds, such as during engine idling speed, the engine speed can drop even further, thereby potentially resulting in engine stalling or stopping. This hard stopping or stalling of the engine can result in damage to the engine or drivetrain and lead to delays in completing the job function being performed by the work vehicle.

SUMMARY OF THE DISCLOSURE

An engine system includes an internal combustion engine, an energy storage device configured to provide electrical power, and an electrified air-boost system powered by the electrical power from the energy storage device to boost intake air to the internal combustion engine, with the electrified air-boost system further including an electrical machine and a pressure device driven by the electrical machine to output boosted intake air to the internal combustion engine. The engine system also includes a controller, including a processor and memory architecture, operably connected with the electrified air-boost system, with the controller configured to monitor engine speed and engine load during operation of the internal combustion engine, identify an impending engine stall condition based on the monitored engine speed and engine load, and when the impending engine stall condition is identified, temporarily operate the electrified air-boost system to boost the intake air to the internal combustion engine, thereby boosting a torque output of the internal combustion engine.

In another implementation, an engine system for a work vehicle includes an internal combustion engine, an energy storage device configured to provide electrical power, and an electrified air-boost system powered by the electrical power from the energy storage device to boost intake air to the internal combustion engine, with the electrified air-boost system further including an electrical machine and a pressure device driven by the electrical machine to output boosted intake air to the internal combustion engine. The engine system also includes a controller, including a processor and memory architecture, operably connected with the electrified air-boost system, with the controller configured to monitor engine speed and engine load during operation of the internal combustion engine, determine if the engine load exceeds an acceptable engine load threshold for the engine speed of the internal combustion engine in a current operating condition, thereby indicating an impending engine stalling or shutdown of the internal combustion engine, and when the engine load exceeds the acceptable engine load threshold for the engine speed of the internal combustion engine, temporarily operate the electrified air-boost system to boost the intake air to the internal combustion engine, thereby boosting a torque output of the internal combustion engine.

The details of one or more embodiments are set-forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures:

FIG. 5A is a graph illustrating a torque vs. speed curve for operation of an engine, including operation of the engine at low speed in blast mode and without blast mode.

Figure 1:
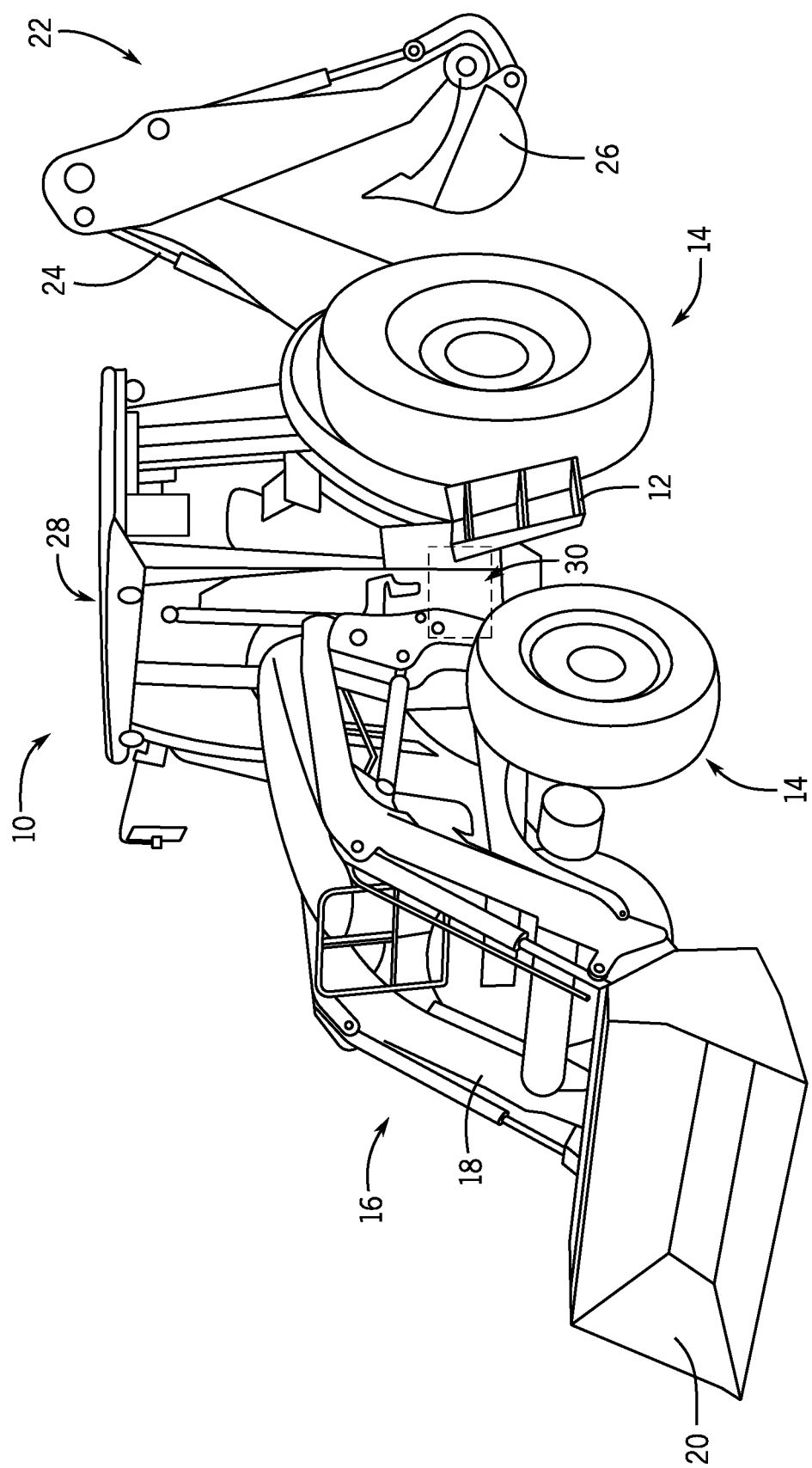
FIG. 1 is a simplified side view of an example work vehicle in which embodiments of the present disclosure may be implemented.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth in the appended claims.

Overview

As previously noted, internal combustion engines employed on work vehicles are expected to operate under a wide variety of load conditions and must be able to accept sudden changes in load. For example, during operation of a backhoe loader, the vehicle may go from an idling condition where the engine is operating at low load, to an operational condition where the bucket is utilized to lift a heavy payload of material and the engine suddenly operates at a high load. The ability of the engine to respond to a sudden increase in load by quickly increasing output torque is limited based on the torque curve (torque vs. engine speed) of the engine. The torque curve allows for a higher engine torque when the engine is operating at a mid- to high speed, but the amount of engine torque that may be generated drops sharply as the engine speed decreases to a low level, such as at an engine idling speed. As an example, a typical work vehicle may only be able to generate about 800 N-m of torque or 50 kW of power with the 4.5 L engine operating at a low idling speed of 600 RPM, and this level of torque/power output may not be sufficient to meet the load demand placed on the engine. In such a situation, the increased load on the engine can cause the engine speed to drop even further as the engine attempts to increase torque, and this downward spiraling of the engine speed will ultimately result in the engine stalling or stopping.

A hard shutdown of the engine can cause damage to components in the engine or components associated therewith. For example, shutdown of the engine can increase lube system wear due to a lack of oil pressure during shutdown and/or can cause bearing failure in turbochargers that provide compressed air to the intake of the engine. Additionally, shutdown of the engine while performing a desired job function, such as lifting a payload, leads to delays in completion of that function, decreasing the productivity of the work vehicle.

To mitigate the potential for engine stalling in a work vehicle at low speeds, an engine system is provided with electrified engine components that are selectively operable to temporarily boost the output torque of the engine. Operation of these components can temporarily enable a higher torque curve (i.e., a higher available torque output at low speed) that minimizes the occurrence of engine stalling. By preventing engine stalling in such conditions, longevity of the engine system and job productivity can be maintained.

According to embodiments, the engine system is controlled to selectively enter into a "blast mode" of operation where the electrified engine components are operated to temporarily boost the output torque of the engine. A controller in the engine system monitors engine speed and engine load during operation of the engine and, based on the monitored engine speed and engine load, identifies an impending engine stall condition. When the impending engine stall condition is identified, the controller provides for power to be provided to the electrified engine components from an energy storage device in the engine system, such as a 48V lithium-ion battery, to temporarily operate the electrified engine components to boost the torque output of the engine, thereby mitigating the potential for stalling of the engine.

In one implementation, the controller selectively operates an electrified air-boost system to mitigate the potential for engine stalling. The electrified air-boost system operates to boost intake air to the internal combustion engine, with an electrical machine in the air-boost system driving a pressure device to output boosted intake air to the engine. In one embodiment, the electrified air-boost system is provided in the form of an e-turbocharger that supplements or replaces other turbochargers in the engine system. The e-turbocharger includes a turbine and a compressor, with an electrical machine driving a shaft that couples the turbine and the compressor to output boosted intake air to the internal combustion engine. In another embodiment, the electrified air-boost system is provided in the form of an e-compressor that is separate from any turbocharger(s) included in the engine system. The e-compressor includes a stand-alone compressor, with an electrical machine driving the compressor to output boosted intake air to the engine. In each of the embodiments, the electrical machine is powered by the energy storage device to enable the pressure device in the electrified air-boost system to operate in a desired manner regardless of the engine speed, as compared to a standard turbocharger/compressor that operates inefficiently at low engine speeds due to the reduced amount of exhaust gas output by the engine at such speeds.

In another implementation, the controller selectively operates an electrified motor-generator unit to mitigate the potential for engine stalling. The motor-generator unit is powered by the energy storage device and operates to provide rotational power to a crankshaft of the engine (via a gearing or belt drive arrangement) to boost the torque output of the engine.

Operation of the engine system in blast mode to cause the electrified engine components to boost the output torque of the engine may be controlled according to one of a time-based, duty cycle-based, or sensor-based period of operation. The time-based and duty cycle-based period of operation may be set to a pre-determined value that sufficiently boosts engine torque to prevent engine stalling while also limiting unnecessary wear on the engine that might occur from prolonged operation in blast mode. The sensor-based period of operation may be determined according to one or more metrics being met that sufficiently boost engine torque to prevent engine stalling, such as a percent torque curve value for example.

Example embodiments of an engine system having electrified engine components that operate to boost engine torque will now be described in conjunction with FIGS. 1-5 according to this disclosure. By way of non-limiting examples, the following describes the engine system as being incorporated into a backhoe loader and as including a turbocharger assembly that includes series-connected high pressure and low-pressure turbochargers for boosting airflow to the internal combustion engine. The following examples notwithstanding, alternative work vehicles and engine systems having turbocharger assemblies of other constructions would also benefit from electrified engine components being incorporated therein according to aspects of the invention. It is therefore recognized that aspects of the invention are not meant to be limited only to the specific embodiments described hereafter.

Example Embodiment(s) of Electrified Engine Boost Components for Mitigating Engine Stalling in a Work Vehicle According to embodiments, an engine system is disclosed that includes electrified engine components that operate to boost engine torque during a blast mode of operation of the engine system. As will become apparent to those skilled in the art from the following description, the engine system finds particular applicability in work vehicles that operate under a wide variety of load conditions, where the engine system must be able to accept sudden changes in load, and therefore the illustrative examples discussed herein utilize such an environment to aid in the understanding of the invention.

Referring initially to FIG. 1, a non-road or work vehicle 10 is shown that can implement embodiments of the invention. In the illustrated example, the work vehicle 10 is depicted as a backhoe loader, and thus is hereafter referenced as "backhoe loader 10." It will be understood, however, that other configurations may be possible, including configurations with the work vehicle as a tractor, a harvester, a log skidder, or one of various other work vehicle types.

The backhoe loader 10 includes a chassis 12 and a ground engaging mechanism or ground drive element 14. The ground engaging mechanism 14 is capable of supporting the chassis 12 and propelling the chassis 12 across the ground. Although the illustrated backhoe loader 10 includes wheels as ground engaging mechanism 14, backhoe loader 10 may include other ground engaging mechanisms, such as steel tracks, rubber tracks, or other suitable ground engaging members.

The backhoe loader 10 further includes a loader assembly 16 and a backhoe assembly 22. As illustrated in FIG. 1, the loader assembly 16 includes a loader boom 18 and a work tool 20 in the form of a bucket. The work tool 20 may be capable of moving, excavating, plowing, or performing other material handling functions on a load, such as dirt or other materials. Other suitable work tools include, for example, blades, pallet forks, bale lifts, augers, harvesters, tillers, mowers, and grapples. The loader boom 18 is configured to move relative to the chassis 12 to move and operate the work tool 20. The backhoe assembly 22 of the backhoe loader 10 includes a backhoe boom 24 and a tool such as a backhoe bucket 26 having telehandler tool features. The backhoe boom 24 is attached to the chassis 12 by a swing frame, with the backhoe boom 24 being pivotable relative to the chassis 12. The backhoe bucket 26 is in turn pivotably mounted to the backhoe boom 24 and extendable away therefrom via an extendable dipperstick, such that the backhoe bucket 26 has further freedom of movement during operation.

An operator controls the functions of the backhoe loader 10, including the ground engaging mechanism 14, the loader assembly 16, and the backhoe assembly 22, from an operator station 28 in the backhoe loader 10. While not shown in FIG. 1, it is recognized that the operator station 28 may include a human-machine interface and various controls therein configured to receive input commands from the operator to control, for example, various electric or hydraulic systems associated with actuating and controlling the loader assembly 16 and the backhoe assembly 22. The human-machine interface may be configured in a variety of ways and may include one or more joysticks, various switches or levers, one or more buttons, a touchscreen interface that may be overlaid on a display, a keyboard, a speaker, a microphone associated with a speech recognition system, or various other human-machine interface devices.

Figure 2:
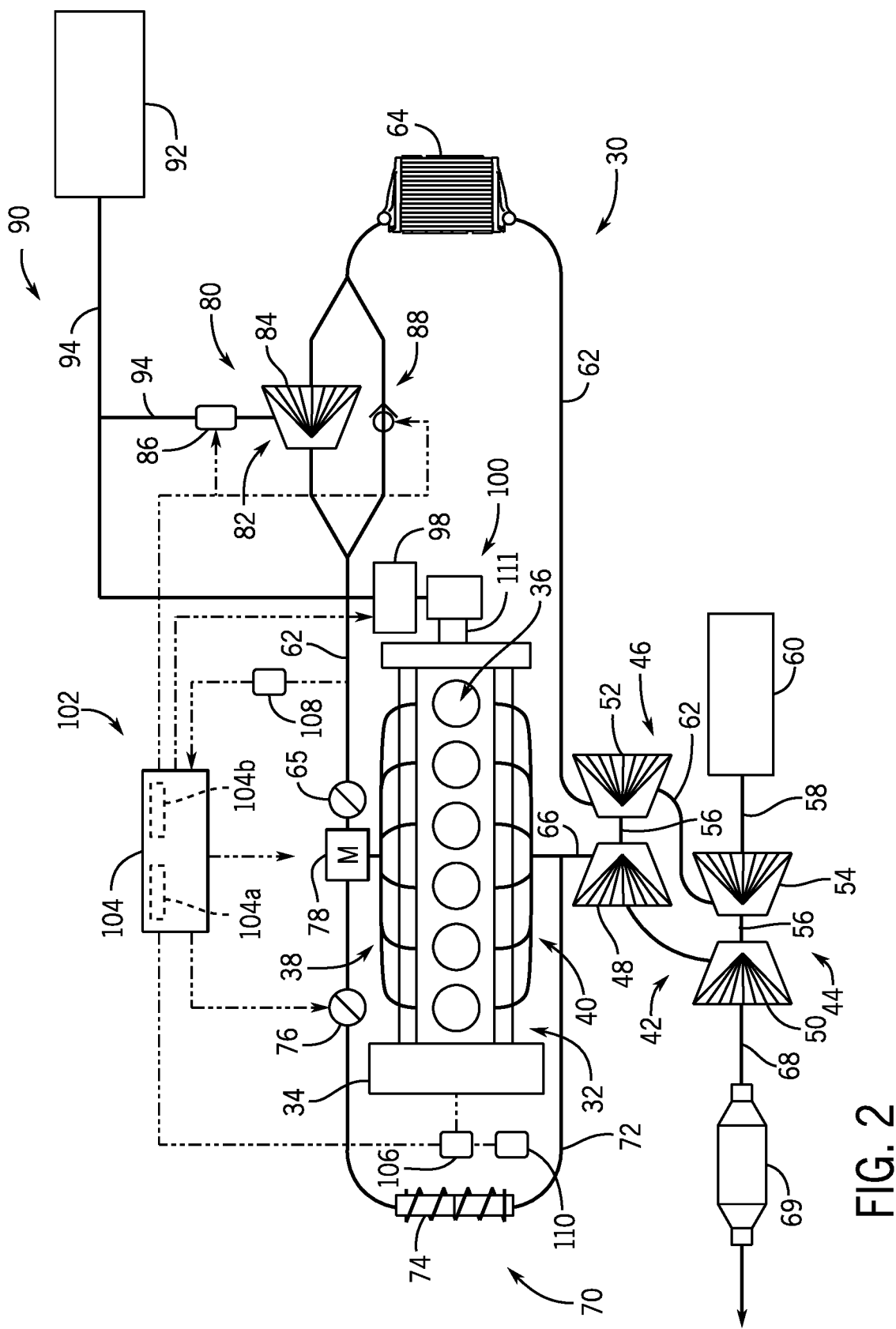
FIG. 2 is a schematic diagram of an example engine system having electrified engine components for boosting engine torque in accordance with an embodiment.

The chassis 12 also supports an engine system 30 that provides, generates, and distributes mechanical and electrical power to various components of the backhoe loader 10. Referring now to FIG. 2, various components of an example engine system 30 that may be included on the backhoe loader 10 are depicted in accordance with an example implementation.

The engine system 30 includes an internal combustion engine 32 (hereafter, "engine") in the form of a diesel-powered engine, although it is recognized that the engine 32 could also be a gasoline powered engine. The engine 32 of the engine system 30 includes an engine block 34 having a piston-cylinder arrangement 36 therein operable to cause combustion events. In the illustrated implementation, the engine 32 is an inline-6 (I-6) engine; however, in alternative implementations various engine styles and layouts may be used.

The engine system 30 also includes an intake manifold 38 fluidly connected to the engine 32, an exhaust manifold 40 fluidly connected to the engine 32, and a turbocharger assembly 42. In the illustrated embodiment, the turbocharger assembly 42 includes a pair of series-connected turbochargers 44, 46 fluidly connected to and in operable communication with the intake manifold 38 and the exhaust manifold 40, although it is recognized that in other embodiments the engine system 30 could instead include only a single turbocharger. As shown in FIG. 2, the turbocharger assembly 42 includes a low-pressure (LP) turbocharger 44 and a high-pressure (HP) turbocharger 46 arranged in series—with each of the turbochargers 44, 46 including a turbine 48, 50 and a compressor 52, 54 mechanically connected via a rotatable shaft 56. In operation of each of the turbochargers 44, 46, exhaust gas flowing through the turbine 48, 50 causes the turbine to rotate, thereby causing the shaft 56 to rotate. Rotation of the shaft 56, in turn, causes the compressor 52, 54, to also rotate, which draws additional air into the compressors 52, 54 to thereby increase or boost the flow rate of air to the intake manifold 38 above what it would otherwise be without the turbochargers 44, 46, and in this manner the turbochargers 44, 46 supply so-called "charge" air to the engine 32.

As indicated, the HP and LP turbochargers 46, 44 are arranged in series with one another. The HP turbocharger 46 features a turbine 48 (HP turbine) for receiving exhaust gas from the exhaust manifold 40, and a compressor 52 (HP compressor) coupled to the HP turbine 48 for delivering pressurized air to the intake manifold 38 for combustion. The LP turbocharger 44 features a turbine 50 (LP turbine) for receiving exhaust gas from the HP turbine 48, and a compressor 54 (LP compressor) coupled to the LP turbine 50 for delivering pressurized air to the HP compressor 52 for further pressurization. Both the LP and HP turbochargers 44, 46 function to recover a portion of heat energy from the exhaust gas with their respective turbines 48, 50, to drive their respective compressors 52, 54 and thereby boost the amount of charge air delivered to the engine 32 for combustion.

As shown in FIG. 2, the intake manifold 38 is in fluid communication with the piston-cylinder arrangement 36 to direct a supply of air thereto. Fresh air is provided to the intake manifold 38 from the ambient environment via a fresh air intake passageway 58. Fresh air is drawn into the fresh air intake passageway 58, passed through an air filter 60 disposed in-line with the fresh air intake passageway 58, and provided to the LP compressor 54. The LP compressor 54 performs a first compression to the fresh air and provides it to the HP compressor 52 via a charge air passageway 62. The charge air passageway 62 then runs from the HP compressor 52 to the intake manifold 38 to provide compressed charge air from the HP compressor 52, with a charge air cooler 64 (i.e., aftercooler) positioned in-line with the charge air passageway 62 that reduces the temperature of the charge air prior to it being provided to the engine 32, to increase the unit mass per unit volume (i.e., density) of the charge air for improved volumetric efficiency and higher power output. In one embodiment, an air throttle 65 is also positioned in the charge air passageway 62 to regulate the amount of compressed charge air provided to the intake manifold 38.

The exhaust manifold 40 of the engine system 30 is fluidly coupled to inlets of the turbines 48, 50 of the turbochargers 44, 46 via an exhaust gas passageway 66, with fluid outlets of the turbines 48, 50 then fluidly coupled to the ambient environment via a vent passageway 68. Exhaust gas produced by the engine 32 is directed out from the exhaust manifold 40 and passes through the exhaust gas passageway 66 to the turbines 48, 50, with the exhaust gas then exiting the turbines 48, 50 to the ambient environment via the vent passageway 68 in a conventional manner. An aftertreatment system 69 may be disposed in-line with the vent passageway 68 to treat the exhaust gas prior to the exhaust gas being vented to ambient, such as by performing a diesel oxidation catalyzation, diesel particulate filtration (DPF) regeneration, or selective catalyst reduction, for example.

An exhaust gas recirculation (EGR) system 70 is further provided in the engine system 30 that functions to recirculate a portion of the exhaust gas generated by the engine 32 and thereby reduce the formation of NOx during combustion. Exhaust gas is drawn from the exhaust manifold 40 and recirculated into the intake manifold 38 via the EGR system 70. The EGR system 70 includes an EGR passageway 72, an EGR cooler 74, an EGR valve 76, and an EGR mixer 78. The EGR passageway 72 draws in a portion of the exhaust gas that is flowing within the exhaust gas passageway 66 for circulation through the EGR system 70. The EGR cooler 74 is disposed in-line with the EGR passageway 72 for the purpose of cooling the exhaust gas flowing through the EGR passageway 72. The EGR valve 76 is disposed in-line with the EGR passageway 72 between the EGR cooler 74 and the EGR mixer 78. In one embodiment, the EGR valve 76 may operate based off a pressure ratio on opposing sides thereof, i.e., of the exhaust gas on one side and the charge air on the other side, with exhaust gas flowing therethrough when the pressure of the exhaust gas is higher than that of the charge air. In another embodiment, the EGR valve may be electrically controlled to selectively control the flow of exhaust gas therethrough, including cutting off the flow of exhaust gas therethrough and selectively restricting or controlling the flow of exhaust gas therethrough by a desired amount. Exhaust gas that flows through the EGR valve 76 is provided to the EGR mixer 78, which intermixes the exhaust gas with the charge air provided from the charge air passageway 62 for introduction to the intake manifold 38, by which the mixed exhaust gas and charge air is then fed to the engine 32. In other implementations, a dedicated EGR mixer 78 may not be included in the engine system 30, with exhaust gas instead being introduced to induction piping of the engine 32 and/or the intake manifold 38 for mixing with the charge air.

As shown in FIG. 2, the engine system 30 further includes an air-boost system 80 that functions to boost the amount of intake or charge air provided to the engine 32. In the illustrated example, the air-boost system 80 is an electrical compressor 82 (hereafter "e-compressor") that includes a compressor 84 driven by an electrical machine 86 (i.e., electric motor). The e-compressor 82 is provided as a stand-alone component that is separate from the turbocharger assembly 42 and may be positioned in any of a number of locations relative to the turbocharger assembly 42. In the illustrated example, the e-compressor 82 is positioned downstream of the charge air cooler 64, but it is recognized that the e-compressor 82 could instead be positioned upstream of the compressors 52, 54 of the turbocharger assembly 42, between the compressors 52, 54, between the HP compressor 52 and the charge air cooler 64, or downstream of the EGR mixer 78. When activated, the electrical machine 86 receives an input power and, responsive thereto, drives the compressor 84 to provide a boosted flow of charge air to the engine 32. During periods where the e-compressor 82 is not operating, intake air may bypass the e-compressor via a bypass valve 88 of the air-boost system 80 arranged in parallel with the e-compressor 82. The bypass valve 88 may be an electrically activated valve that is operated in connection with the e-compressor 82 to control the flow of intake air therethrough.

For providing electrical power to the e-compressor 82, an electrical system 90 is provided in the engine system 30 that may include one or more energy storage devices, inverters, converters, wiring, and other electric components. In one example, the electrical system 90 includes an energy storage device 92 in the form of a lithium-ion battery, although other high-voltage or high-power energy storage devices may instead by employed, such as other battery types, an ultra-capacitor, or a combination of ultracapacitors and/or batteries, as examples. The energy storage device 92 provides a DC power to a power converter (not shown), such as a DC-to-DC converter (but optionally a DC-to-AC converter) that outputs power to a DC bus 94, with the DC bus 94 providing power to multiple devices, outlets, etc. in the engine system 30, including the e-compressor 82 and components such as an electrical motor of a fan used for cooling (not shown), for example. In one implementation, the electrical system 90 is configured as a 48V system that, in combination with engine 32, forms a "hybrid-electric" engine system for the work vehicle 10 (FIG. 1).

In one implementation, an electric motor-generator unit 98 is further provided in the engine system 30. The motor-generator unit 98 is an electrical machine operable in different modes, i.e., as a motor and as a generator, to draw electrical power from the DC bus 94 or to provide power back to the DC bus 94 for recharging the energy storage device 92. When operating as a motor, the motor-generator unit 98 can function to convert electrical power from the DC bus 94 to mechanical power and transfer the mechanical power to the engine 32 via one or more driveline component (s) 100, which may include one or more gear sets, chain-driven sprockets, shafts, belt-drives, and/or other members configured to rotate for transferring mechanical power. The motor-generator unit 98 can therefore operate to assist in starting the engine 32 or to selectively boost an output torque of the engine 32 during operation thereof, as will be explained in greater detail later. When operating as a generator, the motor-generator unit 98 can function to receive power back from the engine 32 (i.e., the engine 32 may drive power back through the driveline component(s) 100) such that the motor-generator unit 98 generates electrical power. The generated power may be supplied to the DC bus 94 for storage in the energy storage device 92 or for supplying to onboard or off-board electrical devices (e.g., the e-compressor 82).

As illustrated in FIG. 2, the engine system 30 includes a control system 102, which includes a controller 104 or electronic control unit (ECU). The controller 104 includes a processor 104a and memory 104b. The processor 104a performs the computation and control functions of the controller 104 and may comprise any type of processor or multiple processors, single integrated circuits such as a microprocessor, or any suitable number of integrated circuit devices and/or circuit boards working in cooperation to accomplish the functions of a processing unit. During operation, the processor 104a executes one or more programs which may be contained within the memory 104b and, as such, controls the general operation of the controller 104 and the computer system of the controller 104 in executing the functions described herein. In the depicted embodiment, the memory 104b stores the above-referenced program(s).

Generally, the controller 104, is used to provide at least some of the engine system operations and functions described herein and, in particular, controls operation of the air boost system and motor generator unit. In general, the controller 104 is electrically coupled with: the engine 32; the EGR valve 76; the e-compressor 82; the bypass valve 88; the motor-generator unit 98; an engine speed sensor 106; and sensor(s) 108 that may include any or all of mass airflow, temperature, and pressure sensors in the intake manifold 38 or charge air passageway 62. While sensors 106, 108 are shown in FIG. 2 as separate, dedicated sensors, it is recognized that sensing capabilities for measuring some parameters may be built-in to components of the engine system 30. The controller 104 may also be coupled with other devices necessary to provide the desired system control functions including various other actuators and sensors, such as a NOx sensor (not shown) and fuel sensor 110. The controller 104 receives inputs from the various sensors that generate signals in proportion to various physical parameters associated with various components in the engine system 30 and any other sources. In some embodiments, the controller 104 may be configured to provide other functionality of the backhoe loader 10 in addition to the control functions disclosed herein.

The controller 104 operates to control the engine system 30 (and engine 32) in various control modes, with the controller 104 operating the engine in the different modes based on inputs received thereby that may include sensor inputs and/or operator command inputs. The different operational modes can include engine start-up mode, engine stop/start mode, cold engine mode, and engine emissions control mode, as examples, and the controller 104 may output control signals to one or more components in the engine system 30 to control operation of the engine system 30 in a specific mode.

According to an embodiment, the controller 104 is also configured to selectively operate the engine system 30 in what is termed herein as a "blast mode" of operation. The controller 104 may cause the engine system 30 to operate in the blast mode of operation when the controller determines or identifies that stalling of the engine 32 is impending or may occur. In one implementation, the controller 104 receives inputs on the engine speed and engine load (as determined by air flow and fuel requested/required, for example) to determine whether the engine load exceeds an acceptable engine load threshold for the engine speed of the engine 32 in its current operating condition, thereby indicating an impending stalling or shutdown of the engine 32. That is, it is recognized that a sharp or sudden increase of the engine load during operation of the engine at low speed can result in the engine being unable to output enough torque to meet the demanded load, i.e., with the necessary torque falling above the torque vs. speed curve of the engine. In this situation, the speed of the engine is caused to fall even further in an effort to output the desired torque, thereby potentially resulting in engine stalling or stopping. Accordingly, the controller 104 switches operation of the engine system 30 to blast mode upon identification of an impending engine stalling in order to provide for a temporary boost in output torque by the engine 32 and thereby mitigate stalling of the engine 32.

When it is determined by the controller 104 that the engine load exceeds the acceptable engine load threshold for the engine speed of the internal combustion engine and that a stalling of the engine 32 is impending, the controller 104 switches operation of the engine system 30 to blast mode. In the blast mode of operation, the controller 104 causes power to be provided from the energy storage device 92 to the e-compressor 82 and/or the motor-generator unit 98 (such as via the DC bus 94), with the e-compressor 82 and/or the motor-generator unit 98 then functioning to temporarily boost the output torque of the engine 32. With the e-compressor 82 operating during blast mode, the electrical machine 86 receives power (from the DC bus 94, for example) and drives the compressor 84 accordingly, thereby boosting the intake charge air to the engine 32 and providing a corresponding boost in torque output by the engine 32 (when accompanied by an increased fuel flow provided to the engine 32). Additionally, the bypass valve 88 is caused to close to direct air through the e-compressor 82. With the motor-generator unit 98 operating during blast mode, the motor-generator unit 98 receives power (from the DC bus 94, for example) and provides a mechanical output accordingly, with a rotational power being transferred to the engine 32 (i.e., to a crankshaft 111 thereof) via the driveline component(s) 100, thereby providing a boost in torque output by the engine 32.

Operation of the engine system 30 in blast mode is limited by the controller 104 to an appropriate duration of time. The engine system 30 may be operated in blast mode according to one of a time-based, duty cycle-based, or sensor-based period of operation. In one embodiment, where blast mode is entered into for a set period of time, the controller 104 operates the engine system 30 in blast mode for a period of 0.1 to 3.0 seconds, such that the torque output of the engine 32 is boosted sufficiently to mitigate engine stalling while preventing excess wear on the engine 32 that could occur if operation in blast mode were prolonged. A similar duty-cycle period of operation of the engine system 30 in blast mode could be determined that similarly boosts output torque sufficiently to mitigate engine stalling while preventing excess wear on the engine 32 could also be implemented. For a sensor-based period of operation, the controller 104 could continue to receive signals from appropriate sensors, including speed sensor 106 and air/fuel sensors 108, 110 for determining load, with the controller 104 determining when the output torque of the engine 32 has been sufficiently boosted to mitigate potential engine stalling based on the sensor inputs.

Figure 3:
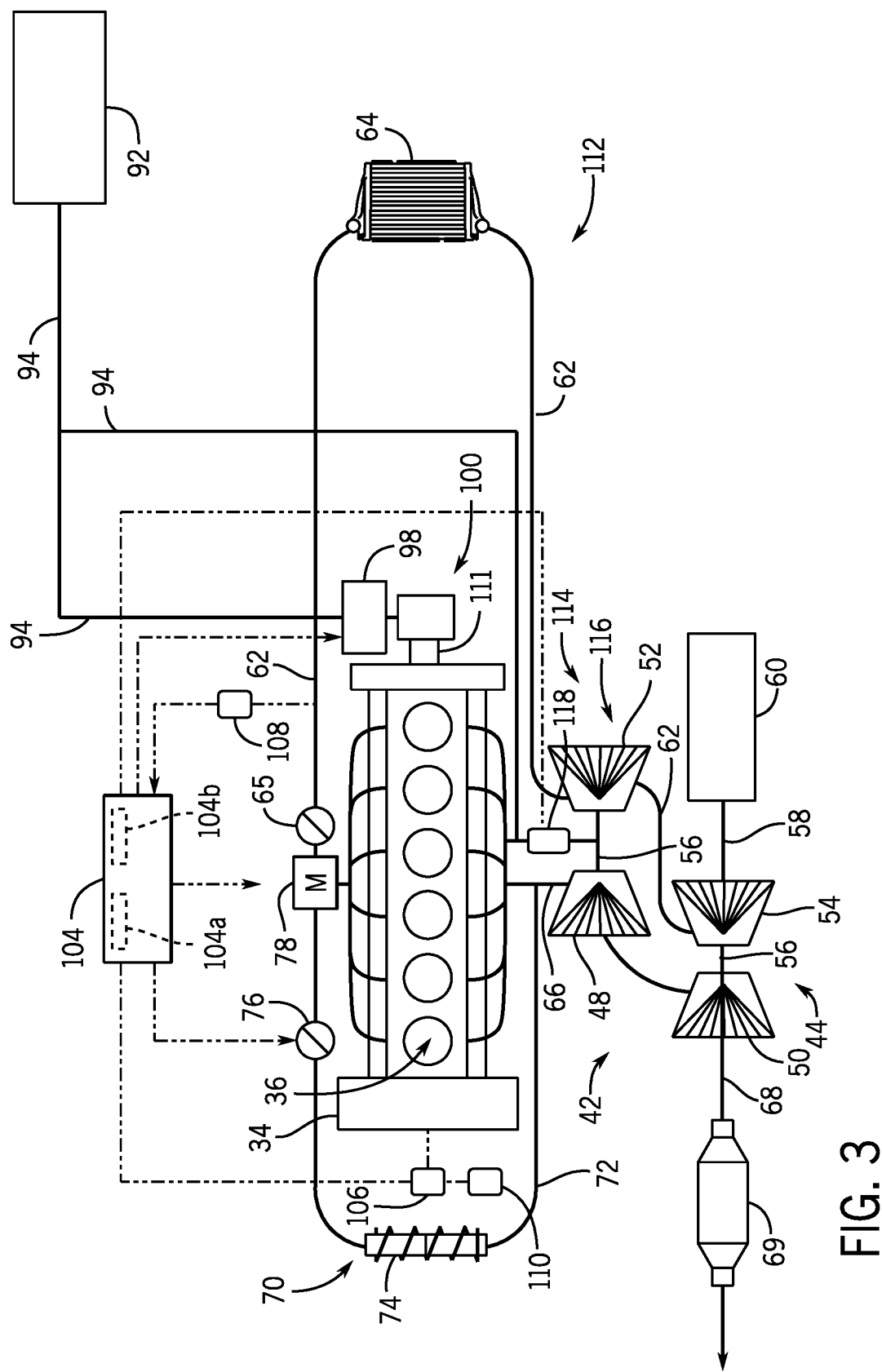
FIG. 3 is a schematic diagram of an example engine system having electrified engine components for boosting engine torque in accordance with another embodiment.

Referring now to FIG. 3, an engine system 112 is illustrated according to another embodiment. The engine system 112 includes many common components as the engine system 30 of FIG. 2, and thus common components of the system are identified consistent with those in FIG. 2. However, in the engine system 112, an air-boost system 114 is provided as an alternative to the air-boost system 80 (i.e., the e-compressor 82) of the engine system 30. In the illustrated embodiment, the air-boost system 114 is provided in the form of an electric turbocharger 116 (hereafter "e-turbocharger") that functions to boost the amount of intake or charge air provided to the engine 32. The e-turbocharger 116 may replace one of the turbochargers 44, 46 included in the turbocharger assembly 42 or, put differently, one of the turbochargers 44, 46 included in the turbocharger assembly 42 may be modified/constructed such that it is in the form of an e-turbocharger 116 instead of a more standard turbocharger that does not include an electrically driven component. In the illustrated example, the e-turbocharger 116 functions as the HP turbocharger 46 in the turbocharger assembly 42, although it is recognized that during operation of the engine system 30 it can occur that the e-turbocharger 116 may be operated while the LP turbocharger 44 is not in operation.

The e-turbocharger 116 includes a turbine 48 and a compressor 52 mechanically connected via a rotatable shaft 56. In operation, exhaust gas flowing through the turbine 48 causes the turbine to rotate, thereby causing the shaft 56 and, in turn, the compressor 52 to rotate. The e-turbocharger 116 also includes an electrical machine 118 (i.e., electric motor) mechanically coupled to the shaft 56 to selectively provide rotation thereto, such as during periods where sufficient exhaust is not present to drive the turbine 48 and, in turn, the shaft 56 and compressor 52 and/or when additional power for driving the shaft 56 is desired. The e-turbocharger 116 may receive electrical power from the electrical system 90 of the engine system 112, with power from the energy storage device 92 provided to the e-turbocharger 116 via the DC bus 94. When activated, the electrical machine 118 receives an input power and, responsive thereto, drives the shaft 56 and, in turn, the compressor 52 to provide a boosted flow of charge air to the engine 32.

As previously described with respect to the embodiment of FIG. 2, the controller 104 is configured to control operation of the engine system 112 in different operational modes, including in a blast mode of operation when the controller 104 determines or identifies that stalling of the engine 32 is impending or may occur. The controller 104 receives inputs on the engine speed and engine load (as determined by air flow and fuel requested/required, for example) to determine whether the engine load exceeds an acceptable engine load threshold for the engine speed of the engine 32 in its current operating condition, thereby indicating an impending stalling or shutdown of the engine 32. When it is determined by the controller 104 that the engine load exceeds the acceptable engine load threshold for the engine speed of the internal combustion engine and that a stalling of the engine 32 is impending, the controller 104 switches operation of the engine system 112 to blast mode. In the blast mode of operation, the controller 104 causes power to be provided from the energy storage device 92 to the e-turbocharger 116, with the e-turbocharger 116 then functioning to temporarily boost the output torque of the engine 32. With the e-turbocharger 116 operating during blast mode, the electrical machine 118 thereof receives power (from the DC bus 94, for example) and drives the shaft 56 and compressor 52 accordingly, thereby boosting the intake charge air to the engine 32 and providing a corresponding boost in torque output by the engine 32.

While each of the engine systems 30, 112 illustrated in FIGS. 2 and 3 is shown as including a motor-generator unit 98, it is recognized that the engine systems 30, 112 could be provided with such a motor-generator unit 98. In such embodiments, only the electrified air-boost system 80, 114, i.e., the e-compressor 82 or e-turbocharger 116, would be operated during the blast mode of operation of the engine system 30, 112 to increase the torque output of the engine 32. Beneficially, each of the e-compressor 82 or e-turbocharger 116 provide what is termed herein as a "power magnification" regarding the output power generated by the engine 32 versus the electrical power input to the e-compressor 82 or e-turbocharger 116 (i.e., to the electrical machine 86, 118 thereof). As an example, the output power of the engine 32 that results from the increased engine torque enabled by the boosted charge air flow provided by the e-compressor 82 or e-turbocharger 116 during blast mode may be in the range of 5-15 output kW per input kW of electrical power provided for to the e-compressor 82 or e-turbocharger 116 from the energy storage device 92.

In still other implementations, an engine system may be provided that includes each of an e-compressor 82, e-turbocharger 116, and motor-generator unit 98 as shown and described in FIGS. 2 and 3. The e-compressor 82, e-turbocharger 116, and motor-generator unit 98 could all be included in an engine system and selectively controlled by the controller 104 to be operated during the blast mode of operation to increase the torque output of the engine 32.

Figure 4:
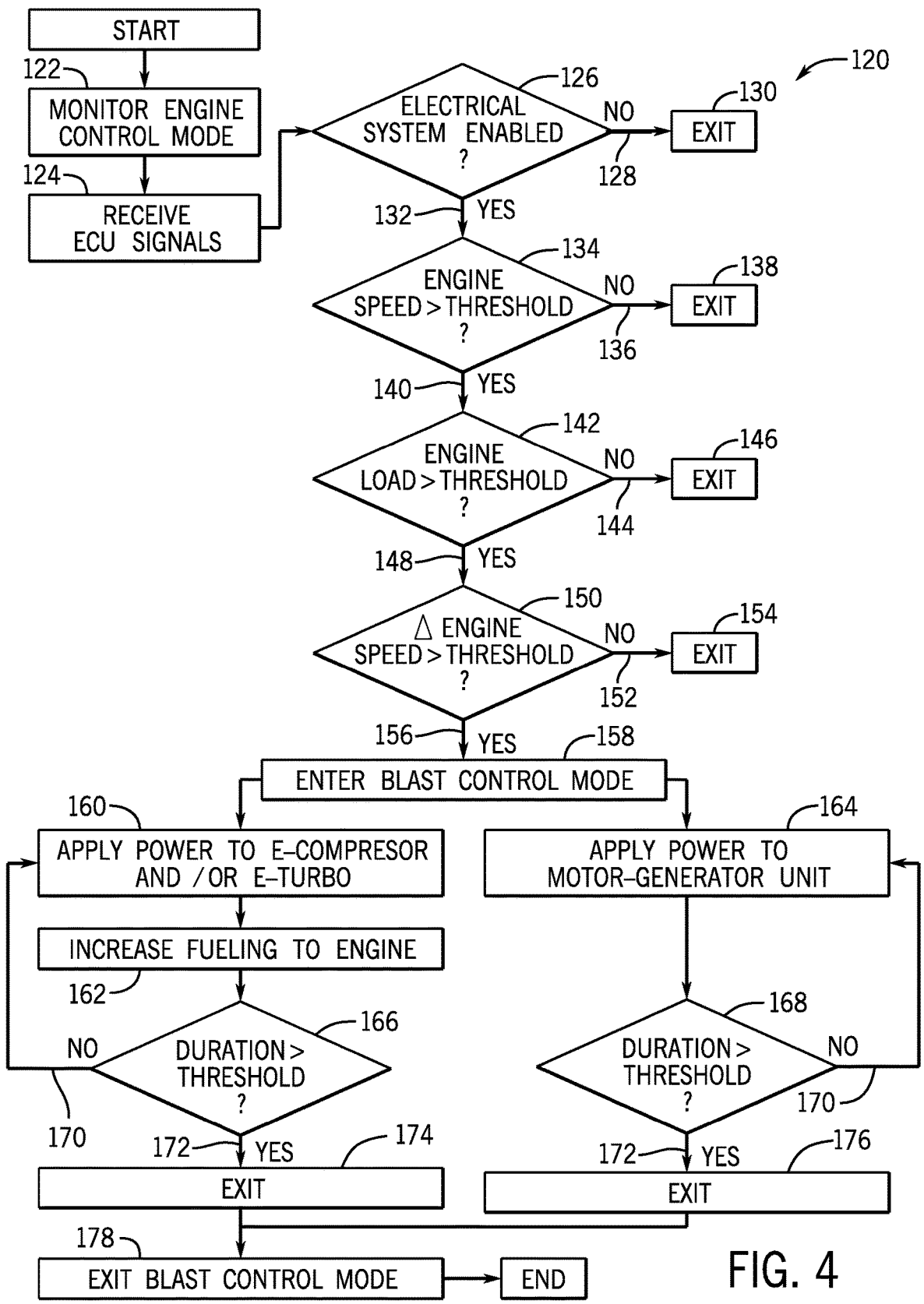
FIG. 4 is a flowchart of an example method of operating an engine system in accordance with an embodiment.

Referring now to FIG. 4, and with continued reference to FIGS. 1-3, a flowchart of a method 120 for operating the engine system 30, 112 is provided in accordance with the present disclosure, such as may be performed by the controller 104. Generally, the method 120 is implemented during operation of the backhoe loader 10. As will be explained in detail below, the method 120 implements a control strategy for selectively operating the engine system 30 in a blast mode to temporarily increase low speed torque of the engine 32 and thereby mitigate engine stalling.

The method 120 begins at step 122 with a monitoring of the control mode of the engine system 30, 112. The control mode may be monitored and determined based on an ongoing analysis of various operational parameters of the engine 32, which may include: engine speed; engine load; mass airflow, temperature, and pressure in intake/charge or exhaust gas; fuel flow; and NOx levels. Based on the monitored and determined engine mode of operation, the controller 104 operates to output command and control signals that are transmitted to and received by components of the engine system 30, 112 that cause operation thereof in a determined mode of operation, as indicated at step 124.

During ongoing operation of the engine system 30, 112 in a determined mode, the method 120 continues at step 126, where a determination is made as to whether the electrical system 90 in the engine system 30, 112 is enabled. If it is determined at step 126 that the electrical system 90 is not enabled, as indicated at 128, then the method 120 continues to step 130, where the control scheme is exited and the method 120 restarts. Alternatively, if it is determined at step 126 that the electrical system 90 is enabled, as indicated at 132, then the method 120 continues to step 134, where a determination is next made regarding whether the current engine speed is below a pre-determined engine speed threshold.

In determining whether the engine speed is below a pre-determined engine speed threshold at step 134, the controller 104 may receive inputs from the engine speed sensor 106, with the measured engine speed being compared to a pre-determined engine speed threshold that may be stored in the memory 104b, for example, to determine if the engine speed falls below that threshold. If it is determined that the engine speed is above the pre-determined engine speed threshold, as indicated at 136, then the method 120 continues to step 138, where the control scheme is exited and the method 120 restarts. Alternatively, if it is determined at step 134 that the engine speed falls below the engine speed threshold, as indicated at 140, then the method 120 continues to step 142, where a determination is next made regarding whether the current engine load is greater than a pre-determined engine load threshold.

In determining whether the engine load is greater than an engine load threshold at step 142, the controller 104 may determine/calculate the engine load based on an air flow and fuel flow (as measured by sensors 108, 110) and compare that engine load to an engine load threshold that may be determined based on the present engine speed, i.e., an acceptable or achievable engine load for the present engine speed. The controller 104 determines whether the engine load exceeds the calculated engine load threshold. If it is determined that the engine load is below the engine load threshold, as indicated at 144, then the method 120 continues to step 146, where the control scheme is exited and the method 120 restarts. Alternatively, if it is determined at step 142 that the engine load exceeds the engine load threshold, as indicated at 148, then the method 120 continues to step 150, where a determination is next made regarding whether the rate of change of the engine speed is greater than an engine speed rate of change threshold, i.e., is the engine speed (RPMs) falling at an unacceptable rate.

In determining whether the rate of change of engine speed exceeds a pre-determined engine speed rate of change threshold at step 150, the controller 104 may receive a series of inputs from the engine speed sensor 106 and determine the rate of change of the engine speed therefrom, with the measured engine speed rate of change being compared to a pre-determined engine speed rate of change threshold that may be stored in the memory 104*b*, for example, to determine if the engine speed rate of change exceeds or falls below that threshold. If it is determined that the engine speed rate of change is less than the pre-determined engine speed rate of change threshold, as indicated at 152, then the method 120 continues to step 154, where the control scheme is exited and the method 120 restarts. Alternatively, if it is determined at step 150 that the engine speed rate of change exceeds the engine speed rate of change threshold (is falling at a high rate), as indicated at 156, then the method 120 continues to step 158, where the controller 104 causes the engine system 30, 112 to enter into blast mode to mitigate the potential for engine stalling.

According to the embodiment of the method 120 shown in FIG. 4, when entering into blast mode at step 158, the controller 104 can simultaneously control operation of the motor-generator unit 98 and the air-boost system 80, 114 (either or both of the e-compressor 82 or the e-turbocharger 116) in order to increase the output torque of the engine 32.

At step 160, the controller 104 causes power to be provided to the air-boost system 80, 114 from the energy storage device 92 (and via the DC bus 94, for example). Specifically, power is provided to an electrical machine 86, 118 in the air-boost system 80, 114. In an embodiment where the air-boost system 80, 114 includes the e-compressor 82, the electrical machine 86 thereof drives the compressor 84 to provide a stream of compressed charge air therefrom. In an embodiment where the air-boost system 80, 114 includes the e-turbocharger 116, the electrical machine 118 thereof drives the shaft 56 of the e-turbocharger 116 in order to drive the compressor 52 and thereby provide a stream of compressed charge air therefrom. The increased flow of charge air output from the air-boost system 80, 114 is accompanied by an increase in fuel provided to the engine 32, as indicated at step 162, with the engine 32 thus able to output increased torque in response to the additional charge air and fuel provided thereto.

At step 164, the controller 104 causes power to be provided to the motor-generator unit 98 from the energy storage device 92 (and via the DC bus 94, for example). Upon being provided power thereto, the motor-generator unit 98 functions as a motor to convert the electrical power to mechanical power and transfer the mechanical power to the engine 32 via one or more driveline component(s) 100 (e.g., gear sets, chain-driven sprockets, shafts, belt-drives, etc.), with rotational power being provided to a crankshaft 111 of the engine 32. The motor-generator unit 98 therefore assists the engine 32 in generating increased output torque.

Upon entering into blast mode and causing one or more of the motor-generator unit 98 and the air-boost system 80, 114 (either of both of the e-compressor 82 or the e-turbocharger 116) to increase the output torque of the engine 32, the method 120 continues at steps 166, 168, where a determination is made regarding whether operation of the engine system 30, 112 in blast mode (i.e., the duration of operation in blast mode) has exceeded a threshold period of operation. The threshold may be a time-based, duty cycle-based, or sensor-based threshold period of operation. In an embodiment where the threshold is a time-based threshold, the threshold may be a pre-determined period of operation, such as a period of 0.1 to 3.0 seconds for example. In an embodiment where the threshold is a sensor-based threshold, the threshold may be a pre-determined percent (%) torque curve value, such as 90% or 100%. For each of steps 166, 168, if it is determined that the duration in which the engine system 30, 112 has been operating in blast mode does not exceed the threshold value (or the sensor-based value being monitored, e.g., % torque curve, does not exceed its threshold value), as indicated at 170, then the method 120 loops back to steps 160, 164, where operation in blast mode is continued by power being further applied to the motor-generator unit 98 and/or the air-boost system 80, 112, to continue boosting output torque of the engine 32. Alternatively, if it is determined that the duration in which the engine system 30, 112 has been operating in blast mode exceeds the threshold value (or the sensor-based value being monitored, e.g., % torque curve, exceeds its threshold value), as indicated at 172, then the method 120 continues to steps 174, 176, where an exit command is executed by the controller 104 and whereby the blast mode of operation of the engine system 30 is then exited at step 178. Exiting of the blast mode upon the determinations performed at steps 166, 168, beneficially provides a sufficient boost of output torque by the engine 32 to mitigate engine stalling, while preventing excess wear on the engine 32 that could occur if the engine system 30 is operated in blast mode for a prolonged period of time.

Beneficially, the performing of the method 120—including operation of the engine system 30, 112 in blast mode—allows for an increase in the torque and power output of the engine 32 responsive to a sharp increase in load while the engine 32 is operating at low speed. That is, the (brake) torque vs. speed curve and (brake) power vs. speed curve of the engine 32 can be raised (i.e., torque/power achievable at low speed) in response to temporary operation of the engine system 30, 112 in blast mode. The increase in the torque vs. speed curve and the power vs. speed curve that is achievable at low engine speeds—via use of the blast mode of operation—are shown in FIGS. 5A and 5B, respectively, according to one example.

FIG. 5A shows torque vs. speed curves for operation of a number of different horsepower rated engines, with curves provided for those engines operated with no blast mode available (generally indicated at 180) and with the blast mode available during operation at low speed (generally indicated at 182—with curves shown for different types of electrified engine component torque boost provided). As can be seen, the engines operated with no blast mode available at low speed are only able to generate a low level of torque (e.g., about 800 N-m) with the engines operating at a low idling speed (e.g., 600 RPM). Comparatively, the engines operated in blast mode at low speed generate a boosted level of torque (e.g., about 1800 N-m) with the engines operating at a low idling speed. Therefore, it can be seen that an increase in low-speed engine torque of approximately 110% can be achieved via operation in blast mode, according to embodiments of the invention.

Figure 5B:
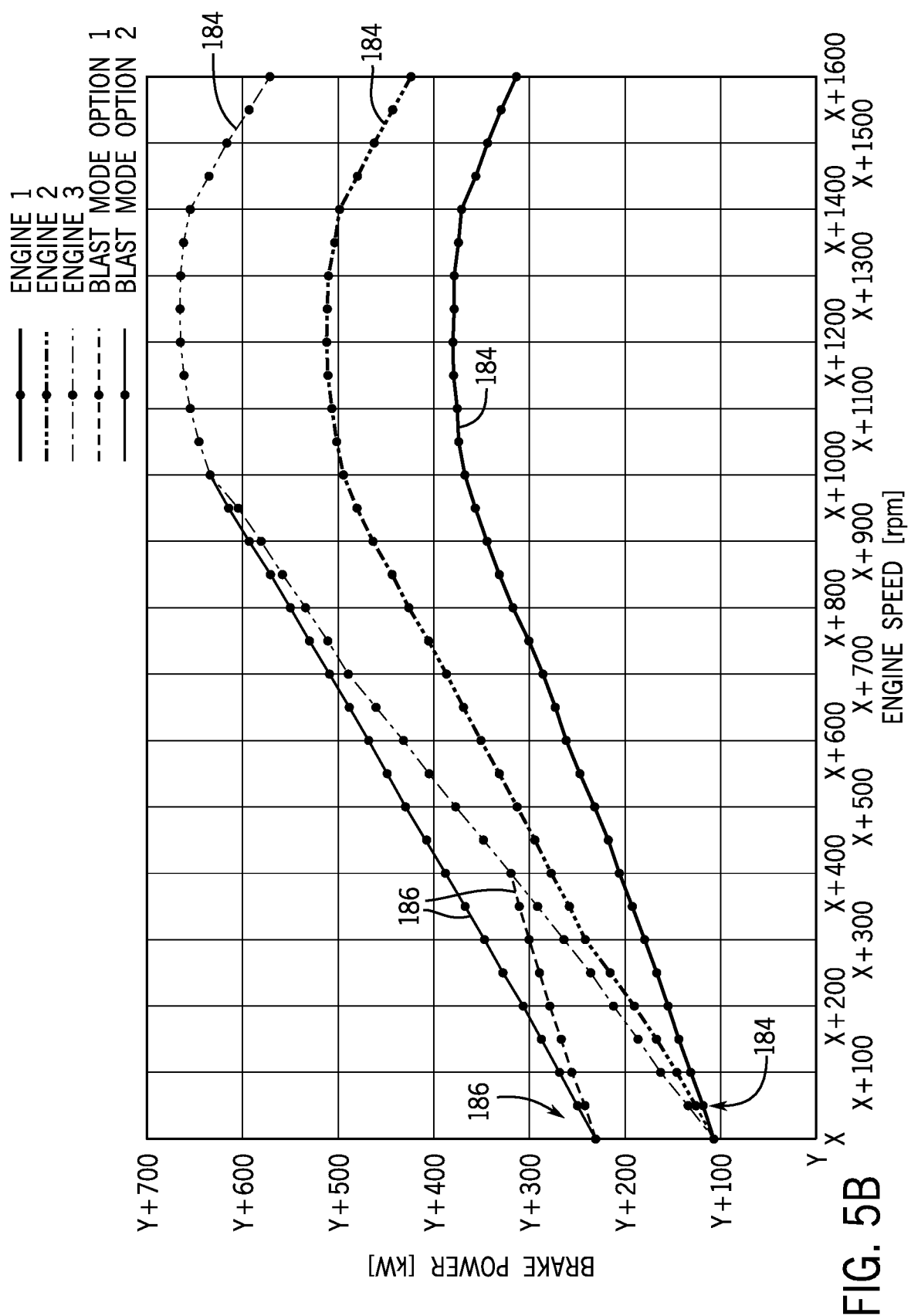
FIG. 5B is a graph illustrating a power vs. speed curve for operation of an engine, including operation of the engine at low speed in blast mode and without blast mode.

FIG. 5B shows power vs. speed curves for operation of a number of different horsepower rated engines, with curves provided for those engines operated with no blast mode of available (generally indicated at 184) and with the blast mode available during operation at low speed (generally indicated at 186—with curves shown for different types of electrified engine component torque boost provided). As can be seen, the engines operated with no blast mode available at low speed are only able to generate a low level of power (e.g., about 50 kW) with the engines operating at a low idling speed (e.g., 600 RPM). Comparatively, the engines operated in blast mode at low speed generate a boosted level of power (e.g., about 110 kW) with the engines operating at a low idling speed. Therefore, it can be seen that an increase in low-speed engine power of approximately 110% can be achieved via operation in blast mode, according to embodiments of the invention.

Desirably, embodiments of the engine system described herein provide an efficient means by which to mitigate engine stalling in work vehicles where the engine experiences sudden changes in load, including when the engine is operating at low speed. An engine system in the work vehicle includes electrified engine components that are selectively operable to boost engine torque and power during a blast mode of operation of the engine system. According to a controller implemented method or control scheme, the electrified engine components may be activated when an impending engine stall condition is identified, as determined based on engine speed and engine load values monitored during operation of the engine. The blast mode of operation may be maintained for a period that sufficiently boosts the torque output of the engine to mitigate engine stalling while preventing excess wear on the engine that could occur if operation in boost mode were maintained for a longer period.

Enumerated Examples

The following examples are provided, which are numbered for ease of reference.

1. An engine system includes an internal combustion engine, an energy storage device configured to provide electrical power, and an electrified air-boost system powered by the electrical power from the energy storage device to boost intake air to the internal combustion engine, with the electrified air-boost system further including an electrical machine and a pressure device driven by the electrical machine to output boosted intake air to the internal combustion engine. The engine system also includes a controller, including a processor and memory architecture, operably connected with the electrified air-boost system, with the controller configured to monitor engine speed and engine load during operation of the internal combustion engine, identify an impending engine stall condition based on the monitored engine speed and engine load, and when the impending engine stall condition is identified, temporarily operate the electrified air-boost system to boost the intake air to the internal combustion engine, thereby boosting a torque output of the internal combustion engine.

2. The engine system of example 1, wherein the electrified air-boost system is an e-turbocharger, with the pressure device being a turbocharger having a compressor driven by a turbine, and wherein the electrical machine of the e-turbocharger drives a shaft that couples the turbine and the compressor, to output boosted intake air to the internal combustion engine.

3. The engine system of example 1, wherein the electrified air-boost system is an e-compressor, with the pressure device being a compressor that boosts intake air to the internal combustion engine, and wherein the electrical machine of the e-compressor drives the compressor, to output boosted intake air to the internal combustion engine.

4. The engine system of example 3, further including a turbocharger assembly including a low-pressure turbocharger and a high-pressure turbocharger, and wherein the e-compressor is positioned upstream from the low-pressure turbocharger, between the low-pressure turbocharger and the high-pressure turbocharger, or downstream of the high-pressure turbocharger.

5. The engine system of example 1, further including a motor-generator unit that receives the electrical power from the energy storage device and provides rotational power to a crankshaft of the internal combustion engine to boost the torque output of the internal combustion engine, and wherein the controller is configured to temporarily operate the motor-generator unit to provide the rotational power to the crankshaft when the impending engine stall condition is identified.

6. The engine system of example 1, wherein in monitoring the engine speed, the controller is configured to monitor each of the engine speed and an engine speed rate of change.

7. The engine system of example 6, wherein in identifying the impending engine stall condition, the controller is configured to compare each of the engine speed, the engine speed rate of change, and the engine load to a respective threshold and initiate operation of the electrified air-boost system upon each of the engine speed, the engine speed rate of change, and the engine load crossing its respective threshold.

8. The engine system of example 7, wherein the controller is configured to identify the impending engine stall condition when the engine load exceeds an acceptable engine load threshold for the engine speed and the engine speed rate of change of the internal combustion engine in a current operating condition.

9. The engine system of example 1, wherein the controller is configured to temporarily operate the electrified air-boost system to boost the torque output according to one of a time-based, duty cycle-based, or sensor-based period of operation.

10. The engine system of example 9, wherein the controller is configured to temporarily operate the electrified air-boost system for a period of 0.1 to 3.0 seconds.

11. The engine system of example 1, wherein the energy storage device comprises a battery system that provides 36V power or greater.

12. The engine system of example 1, wherein the electrified air-boost system provides a power magnification of 5-15 output kW per input kW of electrical power from the energy storage device, to boost the torque output of the internal combustion engine.

13. An engine system for a work vehicle includes an internal combustion engine, an energy storage device configured to provide electrical power, and an electrified air-boost system powered by the electrical power from the energy storage device to boost intake air to the internal combustion engine, with the electrified air-boost system further including an electrical machine and a pressure device driven by the electrical machine to output boosted intake air to the internal combustion engine. The engine system also includes a controller, including a processor and memory architecture, operably connected with the electrified air-boost system, with the controller configured to monitor engine speed and engine load during operation of the internal combustion engine, determine if the engine load exceeds an acceptable engine load threshold for the engine speed of the internal combustion engine in a current operating condition, thereby indicating an impending engine stalling or shutdown of the internal combustion engine, and when the engine load exceeds the acceptable engine load threshold for the engine speed of the internal combustion engine, temporarily operate the electrified air-boost system to boost the intake air to the internal combustion engine, thereby boosting a torque output of the internal combustion engine.

14. The engine system of example 13, wherein the electrified air-boost system is one of an e-turbocharger, with the pressure device being a turbocharger having a compressor driven by a turbine and wherein the electrical machine of the e-turbocharger drives a shaft that couples the turbine and the compressor to output boosted intake air to the internal combustion engine, or an e-compressor, with the pressure device being a compressor that boosts intake air to the internal combustion engine and wherein the electrical machine of the e-compressor drives the compressor to output boosted intake air to the internal combustion engine.

15. The engine system of example 13, wherein in monitoring the engine speed, the controller is configured to monitor each of the engine speed and an engine speed rate of change, and wherein the controller is configured to identify an impending engine stall condition when the engine load exceeds the acceptable engine load threshold, when the engine speed falls below an engine speed limit, and when the engine speed rate of change exceeds a rate of change threshold, with the controller temporarily operating the electrified air-boost system to boost the torque output of the internal combustion engine when the impending engine stall condition is identified.

CONCLUSION

The foregoing has thus provided an engine system that mitigates engine stalling in a work vehicle during low speed, high load conditions of operation. The includes electrified engine components that are selectively operable to boost engine torque and power during a blast mode of operation of the engine system. According to a controller implemented method or control scheme, the electrified engine components may be activated when an impending engine stall condition is identified, as determined based on engine speed and engine load values monitored during operation of the engine. The blast mode of operation may be maintained for a period that sufficiently boosts the torque output of the engine to mitigate engine stalling while preventing excess wear on the engine that could occur if operation in boost mode were maintained for a longer period.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C). Also, the use of "one or more of" or "at least one of" in the claims for certain elements does not imply other elements are singular nor has any other effect on the other claim elements.

As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. An engine system comprising:
   an internal combustion engine;
   an energy storage device configured to provide electrical power;
   an electrified air-boost system powered by the electrical power from the energy storage device to boost intake air to the internal combustion engine, the electrified air-boost system comprising:
   an electrical machine; and
   a pressure device driven by the electrical machine to output boosted intake air to the internal combustion engine; and
   a controller, including a processor and memory architecture, operably connected with the electrified air-boost system, the controller configured to:
   monitor engine speed and engine load during operation of the internal combustion engine;
   identify an impending engine stall condition based on the monitored engine speed and engine load; and
   when the impending engine stall condition is identified, temporarily operate the electrified air-boost system to boost the intake air to the internal combustion engine, thereby boosting a torque output of the internal combustion engine.

2. The engine system of claim 1, wherein the electrified air-boost system comprises an e-turbocharger, with the pressure device comprising a turbocharger having a compressor driven by a turbine, and wherein the electrical machine of the e-turbocharger drives a shaft that couples the turbine and the compressor, to output boosted intake air to the internal combustion engine.

3. The engine system of claim 1, wherein the electrified air-boost system comprises an e-compressor, with the pressure device comprising a compressor that boosts intake air to the internal combustion engine, and wherein the electrical machine of the e-compressor drives the compressor, to output boosted intake air to the internal combustion engine.

4. The engine system of claim 3, further comprising a turbocharger assembly including a low-pressure turbocharger and a high-pressure turbocharger, and wherein the e-compressor is positioned upstream from the low-pressure turbocharger, between the low-pressure turbocharger and the high-pressure turbocharger, or downstream of the high-pressure turbocharger.

5. The engine system of claim 1, further comprising a motor-generator unit that receives the electrical power from the energy storage device and provides rotational power to a crankshaft of the internal combustion engine to boost the torque output of the internal combustion engine, and wherein the controller is configured to temporarily operate the motor-generator unit to provide the rotational power to the crankshaft when the impending engine stall condition is identified.

6. The engine system of claim 1, wherein in monitoring the engine speed, the controller is configured to monitor each of the engine speed and an engine speed rate of change.

7. The engine system of claim 6, wherein in identifying the impending engine stall condition, the controller is configured to:
  compare each of the engine speed, the engine speed rate of change, and the engine load to a respective threshold; and
  initiate operation of the electrified air-boost system upon each of the engine speed, the engine speed rate of change, and the engine load crossing its respective threshold.

8. The engine system of claim 7, wherein the controller is configured to identify the impending engine stall condition when the engine load exceeds an acceptable engine load threshold for the engine speed and the engine speed rate of change of the internal combustion engine in a current operating condition.

9. The engine system of claim 1, wherein the controller is configured to temporarily operate the electrified air-boost system to boost the torque output according to one of a time-based, duty cycle-based, or sensor-based period of operation.

10. The engine system of claim 9, wherein the controller is configured to temporarily operate the electrified air-boost system for a period of 0.1 to 3.0 seconds.

11. The engine system of claim 1, wherein the energy storage device comprises a battery system that provides 36V power or greater.

12. The engine system of claim 1, wherein the electrified air-boost system provides a power magnification of 5-15 output kW per input kW of electrical power from the energy storage device, to boost the torque output of the internal combustion engine.

13. An engine system for a work vehicle, the engine system comprising:
  an internal combustion engine;
  an energy storage device configured to provide electrical power;
  an electrified air-boost system powered by the electrical power from the energy storage device to boost intake air to the internal combustion engine, the electrified air-boost system comprising:
    an electrical machine; and
    a pressure device driven by the electrical machine to output boosted intake air to the internal combustion engine; and
  a controller, including a processor and memory architecture, operably connected with the electrified air-boost system, the controller configured to:
    monitor engine speed and engine load during operation of the internal combustion engine;
    determine if the engine load exceeds an acceptable engine load threshold for the engine speed of the internal combustion engine in a current operating condition, thereby indicating an impending engine stalling or shutdown of the internal combustion engine; and
    when the engine load exceeds the acceptable engine load threshold for the engine speed of the internal combustion engine, temporarily operate the electrified air-boost system to boost the intake air to the internal combustion engine, thereby boosting a torque output of the internal combustion engine.

14. The engine system of claim 13, wherein the electrified air-boost system comprises an e-turbocharger, with the pressure device comprising a turbocharger having a compressor driven by a turbine, and wherein the electrical machine of the e-turbocharger drives a shaft that couples the turbine and the compressor, to output boosted intake air to the internal combustion engine.

15. The engine system of claim 13, wherein the electrified air-boost system comprises an e-compressor, with the pressure device comprising a compressor that boosts intake air to the internal combustion engine, and wherein the electrical machine of the e-compressor drives the compressor, to output boosted intake air to the internal combustion engine.

16. The engine system of claim 13, further comprising a motor-generator unit that receives the electrical power from the energy storage device and provides rotational power to a crankshaft of the internal combustion engine to boost the torque output of the internal combustion engine.

17. The engine system of claim 16, wherein the controller is configured to temporarily operate the motor-generator unit to provide rotational power to the crankshaft when the engine load exceeds the acceptable engine load threshold for the engine speed of the internal combustion engine.

18. The engine system of claim 13, wherein in monitoring the engine speed, the controller is configured to monitor each of the engine speed and an engine speed rate of change.

19. The engine system of claim 18, wherein the controller is configured to identify an impending engine stall condition when the engine load exceeds the acceptable engine load threshold, when the engine speed falls below an engine speed limit, and when the engine speed rate of change exceeds a rate of change threshold, with the controller temporarily operating the electrified air-boost system to boost the torque output of the internal combustion engine when the impending engine stall condition is identified.

20. The engine system of claim 13, wherein the controller is configured to temporarily operate the electrified air-boost system to boost the torque output according to one of a time-based, duty cycle-based, or sensor-based period of operation.

* * * * *